United States Patent
Delaveau et al.

(10) Patent No.: US 7,729,693 B2
(45) Date of Patent: Jun. 1, 2010

(54) METHOD OF CONTROLLING AND ANALYZING COMMUNICATIONS IN A TELEPHONE NETWORK

(75) Inventors: François Delaveau, Le Perreux sur Marne (FR); Domininique Heurguier, Le Perreux sur Marne (FR)

(73) Assignee: Thales (FR)

( * ) Notice: Subject to any disclaimer, the term of this patent is extended or adjusted under 35 U.S.C. 154(b) by 369 days.

(21) Appl. No.: 11/578,513

(22) PCT Filed: Apr. 8, 2005

(86) PCT No.: PCT/EP2005/051570
§ 371 (c)(1),
(2), (4) Date: Oct. 16, 2006

(87) PCT Pub. No.: WO2005/112497
PCT Pub. Date: Nov. 24, 2005

(65) Prior Publication Data
US 2008/0020749 A1   Jan. 24, 2008

(30) Foreign Application Priority Data
Apr. 16, 2004   (FR) .................................. 04 04043

(51) Int. Cl.
*H04W 24/00* (2009.01)
(52) U.S. Cl. .................. 455/424; 455/67.11; 375/213
(58) Field of Classification Search ............... 455/423, 455/436, 446, 509, 524, 13.1, 67.11, 424; 370/331, 335–337, 525; 375/213
See application file for complete search history.

(56) References Cited

U.S. PATENT DOCUMENTS

| | | | |
|---|---|---|---|
| 5,805,575 A  * | 9/1998 | Kamin, Jr. | 370/335 |
| 2002/0105970 A1* | 8/2002 | Shvodian | 370/468 |
| 2003/0143992 A1* | 7/2003 | Humphrey et al. | 455/420 |
| 2004/0131025 A1* | 7/2004 | Dohler et al. | 370/328 |

FOREIGN PATENT DOCUMENTS

| | | | |
|---|---|---|---|
| EP | 1 051 053 A | | 11/2000 |
| EP | 1051053 | * | 11/2000 |
| EP | 1051053 | * | 11/2002 |

(Continued)

OTHER PUBLICATIONS

Applicant Admitted Prior Art.*

(Continued)

*Primary Examiner*—Nick Corsaro
*Assistant Examiner*—Quan M Hua
(74) *Attorney, Agent, or Firm*—Lowe Hauptman Ham & Berner, LLP

(57) ABSTRACT

The invention relates to a method and system for controlling and analyzing cellular radio communications exchanged between mobile terminals and base stations BTS. The invention is characterized in that a dummy mobile terminals and base stations BTS. The invention is comprising a dummy mobile telephone network RRTM_F comprising a dummy base station BTS_F and a dummy mobile terminal MS_F are inserted into the real network RRTM_R, said dummy network being responsible for the decoding and transparent synchronous relaying of messages exchanged between the real network and the real mobile as well as real mobile access control from the real network or the dummy network.

10 Claims, 1 Drawing Sheet

FOREIGN PATENT DOCUMENTS

Figure 1:
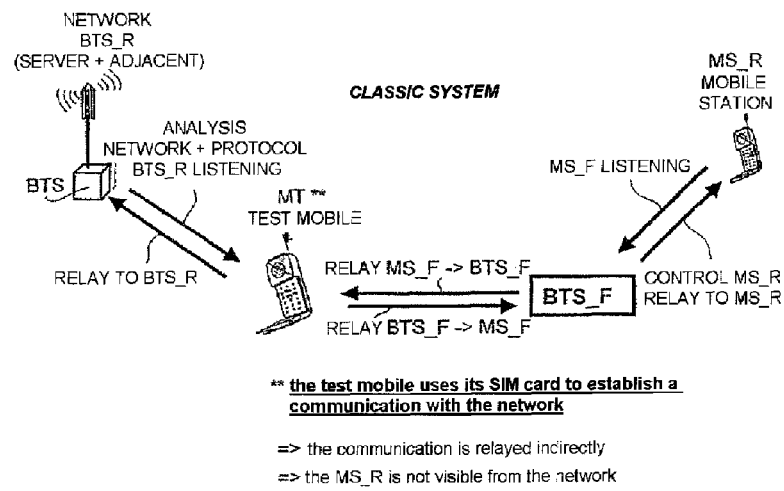

| | | |
|---|---|---|
| FR | 2766320 | 1/1999 |
| FR | 2829241 | 3/2003 |
| FR | 2830710 | 4/2003 |
| WO | 99/12228 | 3/1999 |
| WO | 99/12228 A | 3/1999 |

OTHER PUBLICATIONS

Applicant's Admitted Prior Art.*
FR 99 16775 (Listed in the Specification of U.S. Appl. No. 11/578,513. This application is not published as it is Confidential.

* cited by examiner

** the test mobile uses its SIM card to establish a communication with the network => the communication is relayed indirectly
=> the MS_R is not visible from the network

METHOD OF CONTROLLING AND ANALYZING COMMUNICATIONS IN A TELEPHONE NETWORK

The invention relates notably to a method and a device for retrieving and interpreting the messages exchanged within the framework of communications between one or more mobile telephones (MS) and base stations (BTS) in a cellular digital public network, for example.

It lies, for example, within the framework of protocol logging, control, and production of the content of the signalling messages and of the traffic messages exchanged during communications between base stations (BTS) and mobile terminals (MS).

It also relates to the field of measurement and analysis methods implemented in analysis equipment known to the person skilled in the art, such as, for example, test mobiles (MT) for protocol testers for mobile terminals (TPTM), protocol testers for base stations (TPBS).

The solutions currently used to analyze the communications emanating from the mobile terminals present in second-generation cellular radio networks and to produce the content of the messages are based on the association of a virtual base station and of a test mobile, serving at one and the same time as measurement system for the planning log of the real network and relay between the virtual base station and the real network. Patent EP 1 051 053 B1 describes an example of such a method.

The limits of these systems reside mainly in the following points:

having regard to its measurement capabilities, the test mobile MT frequently has practical difficulties in obtaining the entirety of the network information necessary for the proper operation of the whole of the system, it is therefore obliged to operate in standby and communication mode. The range of the system and its overall reliability are therefore greatly reduced.

having regard to the capabilities of the test mobile MT, it is not possible to finely control the synchronization of the messages transmitted and received by it in the mechanism of relay between the real network and of the base station BTS_F, nor the instants of transmissions of BTS_F.

the test mobile must generally use a SIM card (Subscriber Identity Module) to register itself in the network so as to conduct measurements on the latter, and to subsequently negotiate the protocol steps for establishing session keys with the real network so as to ensure the relaying of the messages decoded by BTS_F to the real network, the real mobile MS_R then no longer being seen by the network.

the existing systems or their variants which seek to circumvent the use of a SIM card have to ascertain data specific to the real mobile terminals so as to substitute themselves for said terminals in the network registration mechanism.

FIG. 1 diagrammatically shows the steps implemented in a conventional system. The test mobile uses its SIM card to establish a communication with the network.

These three major weaknesses induce numerous shortcomings such as:

anomalies of billing for the real mobile MS_R and for the real network BTS_R when the data specific to the SIM card of the real mobile are not known (a relayed outgoing communication is attributed to the subscriber associated with the SIM card of the test mobile), a practical impossibility of contacting the real mobile terminal MS_R from the network (the incoming calls do not complete since relay cannot be suitably ensured by the test mobile MT), various operating anomalies, for example in case of consultation of the messaging thereof by the real mobile MS_R, in case of specific call numbers, etc., limitations of range and of reliability, etc.

The idea of the present invention consists notably in making use in a simultaneous and synchronized manner of the high-performance instrumentation equipment already used for applications of measurement or of quality control of infrastructure transmitters or of cellular radio terminals, equipment supplemented with transmission systems, reception systems and implementation procedures specific to the invention.

The invention relates to a method of controlling and analyzing cellular radio communications exchanged between mobile terminals and base stations BTS, characterized in that a dummy mobile telephone network RRTM_F comprising a dummy base station BTS_F and a dummy mobile terminal MS_F is inserted into the real mobile telephone network RRTM_R, the dummy network ensuring the decoding and a transparent and synchronous relaying of the messages exchanged between the real network and the real mobile, and the control of access of the real mobiles from the real network or from the dummy network.

The messages exchanged are for example messages of broadcast and dedicated signalling in the network access phases, or for the traffic in a situation of communication established (phone, data, short messages, DTMF).

The method may comprise at least the following steps:

the dummy mobile performs a planning log of the network, and determines for each cell of the network its characteristics, the dummy mobile optimizes the choice of a frequency and of the time parameters in conjunction with a dummy beacon signal, the dummy base station transmits on this chosen frequency with the chosen time parameters the dummy beacon signal which is superimposed temporally with the signal normally transmitted by the network and is interpreted by the mobiles of the real base station as a real transmission.

After the planning log of the network, the dummy mobile MS_F transmits for example a selective jamming signal suitable for prohibiting the use of certain frequencies or of certain time intervals or slots by the mobile terminals present and for favoring their going on-hook to the dummy base station.

After the mobile telephone MS_R has gone on-hook to the virtual base station BTS_F, the latter executes at least the following steps:

decoding, interpreting and relaying in a transparent and synchronous manner the messages transmitted between the real base station and the real mobile, irrespective of the origin of the incoming and outgoing call, authenticating the mobile terminals, by using the call channel and the dedicated channels, implementing suitable procedures, leading the mobile to provide its parameters IMSI, IMEI, TMSI, SRES according to appropriate modes and rates of repetition, subsequently leading the dummy network to obtain by a processing specific to the invention the key Ki of the mobile MS_R, leading the dummy network to obtain, after processing, the key Kc of the mobile MS_R for later sessions, leading the mobile to register in its memory or in that of its SIM card, parameters and applications indicated by the dummy network, leading the mobile to transmit the signalling, access and traffic signals on the frequencies indicated by the dummy network.

The method is used for example in a mobile telephone cellular digital public network.

The invention also relates to a system for controlling and analyzing cellular radio communications exchanged between mobile terminal and base stations BTS comprising a dummy mobile telephone network RRTM_F comprising a dummy base station BTS_F and a dummy mobile terminal MS_F, the dummy network being inserted into the real network RRTM_R, characterized in that the dummy network is suitable for ensuring the decoding and a transparent and synchronous relaying of the messages exchanged between the real network and the real mobile, and the control of access of the real mobiles from the real network or from the dummy network.

The invention exhibits notably the following advantages:

it implements fine management of the interaction and of the synchronization between the dummy mobile components MS_F and the dummy base stations BTS_F in the phases of transparent relaying of the messages from the real network to the real mobile, as well as fine management of the synchronization of the dummy network RRTM_F on the real network RRTM_R.

it makes it possible to finely synchronize the transmission signal BCCH_F with the signal transmitted by the real base station BTS_R, thereby limiting the effects of shortcomings and of indiscretion in the real network.

it makes it possible to circumvent the actual registration of the components of the dummy network in the real network, that is to say the circumventing of the use of a SIM card or of the knowledge of the data specific to the real mobile terminals, the use of such a method increases at one and the same time the range, reliability and completeness of the actions on the real mobile terminals MS_R present in the surroundings.

it is optimal in range and sensitivity. It uses for example, for reception, processing based on the recommendations of the standards (demodulation with equalization, known as "data aided" on "middamble", decoding, etc.). The hardware configuration and the processing are therefore optimal, while those of the conventional systems are generally very inferior, notably the demodulation/equalization part.

it can be coupled with techniques used in antenna processing, adaptive filtering and reception processing of signals, equalization, for example described in the patents of the applicant FR 2 766 320 and FR 2 829 241 or else jamming techniques.

Other characteristics and advantages of the present invention will become more apparent on reading the description, given by way of wholly nonlimiting illustration, appended with the figures which represent:

FIG. 1 a conventional communication system

Figure 2:
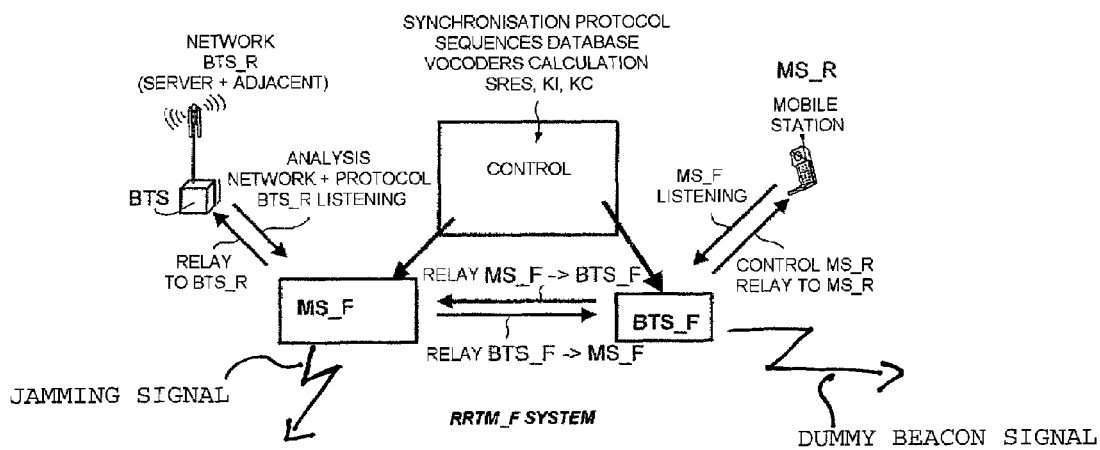

FIG. 2 an exemplary architecture of a system according to the invention.

In order to better elucidate the principle of the invention, the example which follows is given by way of wholly nonlimiting illustration for a system for communication between one or more mobile telephones (MS) and base stations BTS in a mobile telephone cellular digital public network.

FIG. 2 represents an exemplary architecture comprising a real network BTS_R, a mobile telephone MS_R, a dummy mobile telephone network RRTM_F consisting for example of a dummy base station BTS_F and a dummy mobile MS_F. This dummy telephone network is provided with hardware and procedures specific to the implementation of the method according to the invention. It is submerged in the real network RRTM_R and the mobile terminals MS_R contained in the cells of this network. It also comprises a control device whose functions are detailed hereinafter.

The dummy mobile MS_F has notably the function
of scanning the frequencies,
of decoding and of interpreting the signalling of the various cells of the network,
logging the planning of the cells.

It determines notably for each surrounding cell one or more characteristics of the cell, for example:
the level and the C/(I+N) ratio that are received,
the BSIC color codes (identity code of the base station or Base Station Identity Code), the LAC codes (Localization Area Code), and the MCC/MNC codes (Mobile Country Code and Mobile Network) of the cell,
the plan of the frequencies allocated to the cell or CA list of the cell (Cell Allocation list),
the list of frequencies neighboring the cells neighboring the cell, denoted by the expression "BA list",
the cell reselection criteria (denoted C1, C2, etc.).

For a surrounding real cell BTS_R and as a function of the characteristics logged relating to the various surrounding cells, the dummy mobile MS_F optimizes the associated time parameters, for example:
the choice of a frequency Fsel belonging to the BA list of the selected base station BTS_R,
the choice of the instant of transmission and of the time characteristics and synchronization characteristics of a dummy beacon signal BCCH_F,
the choice of the frequencies to be jammed to optimize the link budget.

Dummy Base Station

The dummy base station BTS_F transmits, on the selected frequency Fsel and with the time characteristics chosen and controlled, a dummy beacon signal BCCH_F which:
is superimposed frequency-wise and time-wise on the signal normally transmitted by the network,
is interpreted by the real mobiles MS_R of the real cell BTS_R as a real transmission of the network.

This dummy beacon signal contains various signalling data intended according to the sought-after actions for:
forcing a procedure of relocation onto the dummy base station BTS_F, the real mobile telephone MS_R being thus led to send its parameters (TMSI Temporary Mobile Subscriber Identity, IMSI International Mobile Subscriber Identity, IMEI International Mobile Equipment Identity) in its exchanges therewith,
prohibiting access to the network,
disabling the terminals of the real cell BTS_R on the dummy cell BTS_F,
rejecting the mobile terminals initially disabled towards the real network.

The control facility (covering layers 1, 2, 3 of the air interface) is suitable notably:
for finely analyzing the real network surroundings RRTM_R, for detecting the cells present in these surroundings and the list of their neighboring cells, for logging the criteria for reselecting the various cells, doing so in an entirely passive manner, for decoding and interpreting the signalling or traffic messages originating from the real network RRTM_R, for relaying in a synchronous manner these messages to the mobile terminals with or without modification, for decoding and interpreting the signalling or traffic messages originating from the mobile MS_R, either on its own initiative, or pursuant to a procedure initiated by the real network, or in case of a forced procedure by the dummy network, for relaying in a synchronous manner these messages to the real network RRTM_R with or without modification, in respect of a chosen cell BTS_R of the real network RRTM_R, for transmitting a dummy beacon signal BCCH_F whose characteristics (frequency, instant of start of transmission, synchronization, content of the signalling messages, level, etc.), are determined so that a mobile terminal MS_R in the chosen cell BTS_R is induced to go on-hook to the beacon BCCH_F, thus becoming controlled by the base station BTS_F of the dummy network RRTM_F, for managing, once the beacon signal BCCH_F has been transmitted or, prior to the transmission of this signal or else simultaneously with this transmission, a selective jamming signal, making it possible to prohibit the real mobile MS_R of the chosen cell BTS_R from any connection to the other cells of the real network which might be accessible to it, so as to favor the going on-hook of MS_R onto the BTS_F of the dummy network, for managing, once the mobile MS_R has gone on-hook to be BTS_F, the entirety of the states and of the network procedures provided by the standard and in which the real mobile MS_R and the real base station BTS_R are apt to be found, for forcing any procedure provided by the standard for the management of mobility or the calling of mobiles such as paging, relocating, cell transfer or handover, authentication, identification, establishing of a particular session, picking up of an incoming or outgoing call, etc., for downloading to the real mobile MS_R data or applications by means of the procedures authorized by the standard, for example RAM "Remote Applet Management" or RFM "Remote File Management" functions which respectively allow the downloading of "SIM Application Toolkits" applications or of multimedia data into the SIM card or the terminal, etc., for producing specific information on the basis of the data decoded during the previous phases, for producing information specific to the real mobile MS_R, on the basis of the data decoded during the previous phases.

The method implements for example the steps or phases described hereinafter.

Prior Phase

The dummy mobile MS_F performs a planning log of the network.

Phase of Going On-Hook of One or More Mobile Telephones

The dummy network then transmits a selective jamming signal so as:

to prohibit the use of certain frequencies $F_{nonaut}$ or of certain slots by the mobile terminals present in the real network RRTM_R, to favor the going on-hook of the mobile terminals to the dummy base station BTS_F.

This makes it possible notably to process several surrounding cells (BTS_R1, BTS_R2, ..., BTS_RN) through a judicious choice of frequency, of the instant of transmission and of the time characteristics and synchronization characteristics of the signal BCCH_F and of the selective jamming signal.

Phase After Going On-Hook to a Mobile Telephone

After the real mobile telephone MS_R goes on-hook to the virtual base station BTS_F, the latter:

carries out the decoding, interpretation and transparent and synchronous relaying of the messages transmitted by the real base station BTS_R destined for the real mobile MS_R, carries out the decoding, interpretation and transparent and synchronous relaying of the messages transmitted by the real mobile MS_R destined for the real base station BTS_R, then the virtual base station conducts various procedures and processing operations specific to the invention implementing, from the dummy network RRTM_F, partial or integral procedures normal to the operation of the network, such as:

the authentication, identification and/or registering of the terminals, the downloading of function or parameters into the terminals, the calling of the terminals, etc., using the call channel (PCH) and the dedicated channels (DCCH), the virtual base station executes various procedures known to the person skilled in the art:

leading the real mobile to send its parameters IMSI, IMEI, TMSI, SRES to it according to appropriate modes and rates of repetition, subsequently leading the dummy network to obtain by a processing specific to the invention the authentication key Ki of the mobile MS_R, leading the dummy network to obtain, after appropriate processing, the key Kc created by the system of the real mobile MS_R for later sessions, leading the real mobile to register in its memory or in that of its SIM card parameters and applications indicated by the dummy network, etc.

By relaying the messages from the mobiles to the network and from the network to the mobiles, the dummy network decodes the content thereof.

The method can thereafter comprise the following steps:

After going on-hook and execution of the aforesaid steps, the dummy network BTS_F rejects the real mobile MS_R, for example, by forcing a procedure for cell transfer or handover or for relocation onto a real cell of the network other than BTS_R, or by intentional degradation of the communication leading to its interruption, or by forced interception of the protocol.

Decoding and Interpretation of the Messages of Dedicated Signalling and of the Outgoing or Incoming Traffic Messages of the Real Mobile Telephone MS_R.

To decode and interpret the dedicated signalling messages and the outgoing or incoming traffic messages of the real mobile telephone MS_R, the dummy mobile MS_F and the dummy cell BTS_F are devised in a synchronous manner so that the real mobile MS_R registers itself with the dummy cell BTS_F and, that upon an outgoing call of the mobile telephone MS_R on a network accepting A5/0 transactions, call arriving at the dummy base station BTS_F, the messages of the protocol are decoded and interpreted by BTS_F, and sent to the dummy mobile MS_F which relays them with slight modifications to the real network, decodes and interprets in return the responses of the real network, relays them to the dummy cell BTS_F which relays them to the real mobile; that to do this, the dummy mobile MS_F does not need to establish any communication of its own with the real network nor to have a SIM card;

that upon an incoming call of the mobile telephone MS_R on a network accepting A5/0 transactions, call arriving at the dummy mobile MS_F, the call messages are decoded and interpreted by MS_F, and sent to the dummy BTS BTS_F which relays them with slight modifications to the real mobile MS_R, decodes and interprets in return the responses of the real mobile, relays them to the dummy mobile MS_F which relays them with slight modifications to the real network; that to do this, the dummy mobile MS_F does not need to establish any communication of its own with the real network nor to have a SIM card;

that upon an outgoing call of the mobile telephone MS_R, with key Ki which is known or previously obtained by implementing the invention, on a network not accepting A5/0 transactions, call arriving at the dummy base station BTS_F, the messages of the protocol are decoded and interpreted by BTS_F, and sent to the dummy mobile MS_F which relays them to the real network BTS_R while calculating for this purpose the session key Kc, decodes and interprets in return the responses of the real network, relays them to the dummy cell BTS_F which relays them to the real mobile MS_R using the calculated session key; that to do this, the dummy mobile MS_F does not need to establish any communication of its own with the real network nor to have a SIM card;

that upon an incoming call of the mobile telephone MS_R, with key Ki which is known or previously obtained by implementing the invention, on a network not accepting A5/0 transactions, call arriving at the dummy mobile MS_F, the call messages are decoded and interpreted by MS_F, and sent to the dummy base station BTS_F which relays them to the real mobile MS_R, while calculating for this purpose the session key Kc, then decodes and interprets in return the responses of MS_R, relays them to the dummy mobile MS_F which relays them to the real network using the calculated session key; that to do this, the dummy mobile MS_F does not need to establish any communication of its own with the real network nor to have a SIM card;

that upon an outgoing call of the mobile telephone MS_R, with key Ki which is unknown, on a network not accepting A5/0 transactions, call arriving at the dummy base station BTS_F,
  until the establishment of the session keys, the messages of the protocol are decoded and interpreted by BTS_F, and sent to the dummy mobile MS_F which relays them to the real network BTS_R, decodes and interprets in return the responses of the real network, relays then to the dummy cell BTS F which relays them to the real mobile MS_R;
  that to do this, the dummy mobile MS_F does not need to establish any communication of its own with the real network nor to have a SIM card,
  for the establishment of the session keys between the dummy network and the real mobile MS_R, the dummy BTS BTS_F indicates to the mobile the A5/0 communication mode,
  for the continuation of the relay between the dummy network and the real network BTS_R, the dummy mobile MS_F establishes a normal communication with the real network and in a synchronized manner with the establishment of the link between BTS_F and MS_R and uses a SIM card to do this;

that upon an incoming call destined for the mobile telephone to MS_R, with unknown key Ki, on a network not accepting A5/0 transactions, call arriving at the dummy mobile MS_F,
  until the establishment of the session keys, the messages of the protocol are decoded and interpreted by MS_F, and sent to the dummy BTS BTS_F which relays them to the real mobile MS_R, decodes and interprets in return the responses of the real mobile MS_R, relays then to the dummy mobile MS_F which relays them to the real network BTS_R;
  that to do this, the dummy mobile MS_F does not need to establish any communication of its own with the real network nor to have a SIM card,
  for the establishment of the session keys between the dummy network and the real mobile MS_R, the dummy BTS BTS_F indicates to the mobile the A5/0 communication mode,
  for the continuation of the relay between the dummy network and the real network BTS_R, the dummy mobile MS_F establishes a normal communication with the real network and in a synchronized manner with the establishment of the link between BTS_F and MS_R and uses a SIM card to do this;

that upon an outgoing call of the mobile telephone MS_R with key Ki which is unknown on a network accepting A5/2 transaction, call arriving at the dummy base station BTS_F, the first messages transmitted by MS_R in the network access protocol are decoded and interpreted by BTS_F, and sent to the dummy mobile MS_F which relays them with slight modifications to BTS_R, the first messages transmitted by BTS_R in the network access protocol are decoded and interpreted by MS_F, and sent to BTS_F which relays them with slight modifications to MS_R. BTS_F establishes an A5/2 session with MS_R and MS_F establishes an A5/2 session with BTS_R, then the control facility of the dummy network implements any existing method making it possible to obtain in a sufficiently short time the session key Kc. BTS_F decodes and interprets the messages of MS_R, relays them to MS_F which relays them to BTS_R. MS_F decodes and interprets the messages of BTS_R, relays them to BTS_F which relays them to MS_R. To do this, the dummy mobile MS_F does not need to establish any communication of its own with the real network nor to have a SIM card;

that upon an incoming call of the telephone to the mobile MS_R with key Ki which is unknown on a network accepting A5/2 transactions, call arriving at the dummy mobile MS_F, the first messages transmitted by BTS_R in the network access protocol are decoded and interpreted by MS_F, and sent to BTS_F which relays them with slight modifications to MS_R, the first messages transmitted by MS_R in the network access protocol are decoded and interpreted by BTS_F, and sent to MS_F which relays them with slight modifications to BTS_R. MS_F establishes an A5/2 session with BTS_R and BTS_F establishes an A5/2 session with MS_R, then the control facility of the dummy network implements any existing method making it possible to obtain in a sufficiently short time the session key Kc. MS_F decodes and then interprets the messages of BTS_R, relays them to BTS_F which relays them to MS_R; BTS_F decodes and interprets the messages of MS_R, relays them to MS_F which relays them to BTS_R. To do this, the dummy mobile MS_F does not need to establish any communication of its own with the real network nor to have a SIM card;

that upon an outgoing call of the mobile telephone MS_R with key Ki that is unknown on a network accepting only A5/1 transactions, call arriving at the dummy base station BTS_F, the first messages transmitted by MS_R in the network access protocol are decoded and interpreted by BTS_F, and sent to the dummy mobile MS_F which relays them with slight modifications to BTS_R, the first messages transmitted by BTS_R in the network access protocol are decoded and interpreted by MS_F, and sent to BTS_F which relays them with slight modifications to MS_R. BTS_F establishes a first A5/2 session with MS_R, then the control facility of the dummy network implements any existing method making it possible to obtain in a sufficiently short time the session key Kc. Once the key Kc has been obtained, BTS_F establishes a new A5/1 session while MS_F establishes an A5/1 session with BTS_R. MS_F decodes and then interprets the messages of BTS_R, relays them to BTS_F which relays them to MS_R; BTS_F decodes and interprets the messages of MS_R, relays them to MS_F which relays them to BTS_R. To do this, the dummy mobile MS_F does not need to establish any communication of its own with the real network nor to have a SIM card;

that upon an incoming call of the telephone to the mobile MS_R with key Ki which is unknown on a network accepting only A5/1 transactions, call arriving at the dummy mobile MS_F, the first messages transmitted by BTS_R in the network access protocol are decoded and interpreted by MS_F, and sent to BTS_F which relays them with slight modifications to MS_R, the first messages transmitted by MS_R in the network access protocol are decoded and interpreted by BTS_F, and sent to MS_F, which relays them with slight modifications to BTS_R. BTS_F establishes a first A5/2 session with MS_R, then the control facility of the dummy network implements any existing method making it possible to obtain in a sufficiently short time the session key Kc. Once the key Kc has been obtained, BTS_F establishes a new A5/1 session while MS_F establishes an A5/1 session with BTS_R. BTS_F decodes and interprets the messages of MS_R, relays them to MS_F which relays them to BTS_R; MS_F decodes and then interprets the messages of BTS_R, relays them to BTS_F which relays them to MS_R. To do this, the dummy mobile MS_F does not need to establish any communication of its own with the real network nor to have a SIM card.

Use of specific processing and antennas to carry out the above actions, and notably:

to receive, demodulate and decode the signals, record the content of the messages, determine the direction of arrival and the distance of BTS_R and of MS_R then their location The dummy mobile MS_F and the dummy base station BTS_F of the dummy network RRTM_F use for example specific antennas and adaptive antenna processing, for transmission and for reception, as well as for demodulation.

The processing is for example:

specifically dedicated to the improvement of performance, having formed the subject of the methods filed under the references FR 2 766 320, FR 99 16775, FR 2 829 241, FR 01/12976.

leading the dummy network to operate on cells remote from the place where it is assigned, allowing the dummy network to determine the direction of arrival and to locate the components BTS_R and MS_R.

By way of nonlimiting examples, the invention makes it possible to carry out the procedures and to produce the following information on a mobile terminal MS_R (the list below not being limiting):

rejection of the mobile MS_R towards the network, prohibition of access from the mobile to a cell, to the network, etc., identification parameters of the mobile terminal MS_R (IMSI, IMEI, current TMSI), authentication parameters for the mobile terminal MS_R (SRES), information relating to the key Ki of the mobile terminal MS_R, and to the key Kc for the later sessions, relocation of the mobile MS_R with possible interruption with each phase of the protocol, calling of the mobile MS_R with possible interruption at each phase of the protocol, assignment to the mobile MS_R of parameters registered in the memory of the SIM card, downloading of applications into the mobile MS_R, downloading of parameters registered in the memory of the SIM card present in the mobile MS_R or in the memory of the mobile MS_R, relaying of call attempts from MS_R to BTS_R (outgoing call) until the establishment of communication, forcing of specific procedures signalling to the subscriber a busy call, a messaging or a network unavailable, etc.), relaying of call attempts from BTS_R to MS_R (incoming call), until the establishment of communication, content of the incoming or outgoing communications of the mobile terminal MS_R (speech, data, SMS, DTMF, etc.), etc.

The method according to the invention leads notably to improvements, some of which are given by way of illustration, for example, circumventing the actual registering of the components of the dummy network in the real network, that is to say circumventing the use of a SIM card (Subscriber Identity Module) or of the knowledge of the data specific to the real mobile terminals, the control of terminals in remote cells and for each controlled terminal, the detection and interpretation of calls from the network to the terminals, the relaying of incoming communications, the decoding and interpretation of various signalling and traffic messages relating to incoming communications, the downloading of data or of applications into the terminals.

The invention claimed is:

1. A method of controlling and analyzing cellular radio communications exchanged between mobile terminals and base stations comprising the steps of:

inserting a dummy mobile telephone network including a dummy base station and a dummy mobile terminal into a real network, wherein the dummy network performs transparent and synchronous decoding relaying of messages exchanged between said real network and a real mobile terminal, the real base station simultaneously transmitting to, and receiving from, the dummy mobile terminal messages following a network access protocol as if said dummy mobile terminal were a real mobile subscriber, the real mobile terminal transmitting to, and receiving from, the dummy base station communication data as if said dummy base station were a real network base station, the dummy base station and the dummy mobile terminal fully analyzing and controlling the real base station including the real mobile terminal transmission protocol and associated message contents (receive, decode, interpret, modify, encode, and transmit), wherein the analyzing and controlling comprising:

dictating, the dummy mobile station, the real mobile terminal's usable frequency bands;

obtaining by the dummy network authentication and mobile capability data of the real mobile station, compiling by the dummy network communication logs of characteristics of the communication exchanged with the real network, and controlling and analyzing, from the dummy network, the paging attempts of the real mobile terminals by the real network, and the access attempts of the real mobile terminals to the real network.

2. The method as claimed in claim 1, wherein the messages exchanged are messages of broadcast and dedicated signaling in the network access phases, or for the traffic in a situation of communication established.

3. The method as claimed in claim 2, comprising the following steps:

the dummy mobile performs a planning log of the network, including determining characteristics for each cell, and optimizing the choice of a frequency and time parameters in conjunction with a dummy beacon signal, and the dummy base station transmits on the chosen frequency with the chosen time parameters the dummy beacon signal, wherein the dummy beacon signal is superimposed temporally with a signal normally transmitted by the real network and is interpreted by a real mobile terminal of a real base station as a real transmission.

4. The method as claimed in claim 3, wherein after generating the planning log of the network, the dummy mobile terminal transmits a jamming signal to prohibit the use of certain frequencies, or of certain time intervals, or slots by the real mobile terminals present, and for causing the real mobile terminals to go on-hook to the dummy base station.

5. The method as claimed in claim 4, wherein after the real mobile terminal has gone on-hook to the dummy base station, comprising the following steps:

decoding, interpreting and relaying in a transparent and synchronous manner the messages transmitted between the real base station and the real mobile terminal, and:

authenticating the real mobile terminal, causing the real mobile terminal to provide its parameters IMSI, IMEI, TMSI, SRES, determining an authorization key of the real mobile terminal, obtaining a system key of the real mobile terminal created by the real network, leading the real mobile terminal to register in its memory or in that of its SIM card, parameters and applications indicated by the dummy network, leading the real mobile terminal to transmit the signaling, access and traffic signals on the frequencies indicated by the dummy network.

6. The method as claimed in claim 5, the method further comprising the dummy network rejecting the real mobile terminal by forcing a procedure for cell transfer or handover or for relocation onto a real cell of the network other than the real base station associated with the real mobile terminal, or by intentional degradation of the communication leading to its interruption or by forced interruption of the protocol.

7. The method as claimed in claim 1, wherein used the step of inserting a dummy mobile telephone network including a dummy base station and a dummy mobile terminal into a real network comprises inserting a dummy mobile telephone network including a dummy base station and a dummy mobile terminal into a mobile telephone cellular digital public network.

8. A system for controlling and analyzing cellular radio communications exchanged between mobile telephones and base stations comprising:

a dummy mobile telephone network comprising a dummy base station and a dummy mobile terminal, the dummy mobile telephone network being inserted into a real mobile network, wherein the real mobile network comprises at least one real base station and at least one real mobile station and the dummy network is configured to perform a transparent decoding and synchronous relaying of messages exchanged in the real network and is further configured to control access of the at least one real mobile telephone from the real network or from the dummy network, wherein the dummy mobile terminal excludes any means to establish any communication of its own with the real network;

wherein the real base station is configured to simultaneously transmit to, and receive from, the dummy mobile terminal and for each protocol step of a transmission for a real mobile subscriber, following the network access protocol, wherein the real mobile terminal is configured to transmit to, and receive from, the dummy base station communication data as if said dummy base station were a real network base station, wherein the dummy base station and the dummy mobile terminal are configured to analyze and control the real base station, including the real mobile terminal transmission protocol and associated message contents (receive, decode, interpret, modify, encode, and transmit), wherein the analyzing and controlling comprising:

dictating, the dummy mobile station, the real mobile terminal's usable frequency bands;

obtaining by the dummy network authentication and mobile capability data of the real mobile station, compiling by the dummy network communication logs, wherein said logs contain characteristics of the communication exchanged with the real network, and control the paging attempts of the real mobile terminals by the real network, and the access attempts of the real mobile terminals to the real network.

9. The method as claimed in claim 2, wherein the situation of communication established is one of phone, data, short messages and DTMF.

10. The method as claimed in claim 3, wherein determining characteristics of each cell includes determining at least one of: the level and the C/(I+N) ratio of a received signal; the BSIC color codes (identity code of the base station or Base Station Identity Code), the LAC codes (Localization Area Code), and the MCC/MNC codes (Mobile Country Code and Mobile Network) of the cell; the plan of the frequencies allocated to the cell or cell allocation list; the list of frequencies neighboring the cells neighboring the cell; or the cell reselection criteria.

* * * * *